United States Patent
Bouilloux et al.

(10) Patent No.: US 8,642,703 B2
(45) Date of Patent: *Feb. 4, 2014

(54) POLYHYDROALKANOATE COMPOSITION EXHIBITING IMPROVED IMPACT RESISTANCE

(75) Inventors: Alain Bouilloux, Saint-Leger de Rotes (FR); Sébastien Quinebeche, Bernay (FR); Stephane Girois, Norfolk, VA (US)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,832

(22) Filed: Jan. 17, 2012

(65) Prior Publication Data

US 2012/0316293 A1 Dec. 13, 2012

Related U.S. Application Data

(63) Continuation-in-part of application No. PCT/FR2010/051471, filed on Jul. 13, 2010.

(30) Foreign Application Priority Data

Jul. 17, 2009 (FR) .................................. 09 54956
Feb. 15, 2010 (FR) .................................. 10 51020

(51) Int. Cl.
- *C08L 9/00* (2006.01)
- *C08L 23/00* (2006.01)
- *C08L 25/02* (2006.01)
- *C08L 33/18* (2006.01)
- *C08L 33/20* (2006.01)
- *C08L 37/00* (2006.01)
- *C08L 41/00* (2006.01)

(52) U.S. Cl.
USPC ........... 525/208; 525/232; 525/238; 525/240; 525/241

(58) Field of Classification Search
USPC ............... 525/208, 232, 238, 240, 241
See application file for complete search history.

(56) References Cited

U.S. PATENT DOCUMENTS

| | | |
|---|---|---|
| 2,668,162 A | 3/1952 | Lowe |
| 3,287,443 A | 11/1966 | Saito et al. |
| 3,297,033 A | 1/1967 | Schmitt et al. |
| 3,657,391 A | 4/1972 | Curfman |
| 3,808,180 A | 4/1974 | Owens |
| 3,985,704 A | 10/1976 | Jones et al. |
| 4,096,202 A | 6/1978 | Farnham et al. |
| 4,180,494 A | 12/1979 | Fromuth et al. |
| 4,260,693 A | 4/1981 | Liu |
| 4,299,928 A | 11/1981 | Witman |
| 4,617,366 A | 10/1986 | Gloriod et al. |
| 4,644,044 A | 2/1987 | Gloriod et al. |
| 4,753,980 A | 6/1988 | Deyrup |
| 5,183,851 A | 2/1993 | Visani et al. |
| 5,378,801 A | 1/1995 | Reichert et al. |
| 5,484,882 A | 1/1996 | Takada et al. |
| 5,773,520 A | 6/1998 | Bertelo et al. |
| 5,854,346 A | 12/1998 | Meyer et al. |
| 6,476,145 B1 | 11/2002 | Perret et al. |
| 6,809,151 B1 | 10/2004 | Lacroix et al. |
| 7,022,768 B1 | 4/2006 | Lacroix et al. |
| 7,119,152 B1 | 10/2006 | Lacroix et al. |
| 7,354,973 B2 | 4/2008 | Flexman |
| 7,381,772 B2 | 6/2008 | Flexman et al. |
| 7,595,363 B2 | 9/2009 | Uradnisheck et al. |
| 7,834,092 B2 | 11/2010 | Uradnisheck et al. |
| 8,030,402 B2 | 10/2011 | Hirasawa |
| 8,048,959 B2 | 11/2011 | Uradnisheck et al. |
| 8,137,773 B2 * | 3/2012 | Hiruma et al. ............... 428/34.9 |
| 2005/0131120 A1 | 6/2005 | Flexman |
| 2008/0071008 A1 | 3/2008 | Smillie et al. |
| 2009/0076191 A1 | 3/2009 | Aoyama et al. |
| 2010/0028657 A1 | 2/2010 | Ito et al. |
| 2010/0112357 A1 | 5/2010 | Fine et al. |
| 2010/0160499 A1 | 6/2010 | Cho et al. |
| 2012/0271004 A1* | 10/2012 | Quinebeche et al. ......... 525/190 |

FOREIGN PATENT DOCUMENTS

| | | |
|---|---|---|
| EP | 0 270 865 A2 | 6/1988 |
| GB | 2 091 745 | 8/1982 |
| JP | 07-026001 | 1/1995 |
| JP | 07-053684 | 2/1995 |
| JP | 9316310 | 12/1997 |
| WO | WO 2005/059031 A1 | 6/2005 |
| WO | WO 2009/131079 | 10/2009 |

OTHER PUBLICATIONS

International Search Report dated Oct. 11, 2010, and a Written Opinion for application No. PCT/FR2010/051471.

* cited by examiner

*Primary Examiner* — Nathan M Nutter
(74) *Attorney, Agent, or Firm* — RatnerPrestia

(57) ABSTRACT

A composition including polyhydroxyalkanoic acid (PHA), an elastomeric compound of core-shell type, and an olefinic copolymer including an ethylenic monomer bearing an epoxy function. The PHA composition exhibits improved impact strength.

17 Claims, No Drawings

POLYHYDROALKANOATE COMPOSITION EXHIBITING IMPROVED IMPACT RESISTANCE

TECHNICAL FIELD

The present invention relates to a polyhydroxyalkanoate (PHA) composition with improved impact strength.

PRIOR ART

Polymers of polyhydroxyalkanoate or polyhydroxyalkanoic acid (PHA) type, such as polylactic acid (PLA), are polymers that may be obtained from a monomer of plant origin. They are of major interest on account of their biodegradable properties. However, they are particularly fragile polymers, which require reinforcing with respect to impacts.

In the prior art, mention may be made of document JP H09-316310 which describes PLA compositions containing ethylene-glycidyl methacrylate copolymers grafted with polystyrene or polydimethacrylate, or alternatively polyolefins grafted with maleic anhydride.

More recently, WO 2005/059031 describes a PLA composition comprising from 3% to 40% by mass of a copolymer of ethylene, of a carboxylic acid ester and of a glycidyl ester.

Document US 2008/0071008 discloses a polyhydroalkanoic acid composition comprising from 0.2% to 10% of core-shell compound with a refractive index of less than 1.5 and not comprising any vinyl aromatic monomer.

These compositions do indeed show improved impact strength, but this strength is not entirely satisfactory, especially at a temperature below 20° C.

Moreover, some of these compositions have a fluidity that is markedly inferior to that of PHA. This substantial reduction in fluidity hampers the use, most particularly for thin and large-sized injection-molded parts.

The aim of the present invention is to propose a novel PHA composition that has good impact strength, especially at low temperature.

SUMMARY OF THE INVENTION

The present invention relates to a polyhydroxyalkanoate (PHA) composition also comprising a core-shell elastomeric compound (A) and an olefinic copolymer (B) comprising an ethylenic monomer bearing an epoxy function.

This particular composition comprising an impact modifier combining a core-shell compound with an olefinic copolymer has exceptional impact properties that are, surprisingly, much better than those of the compositions of the prior art and in particular much better than compositions comprising an impact modifier consisting of an olefinic copolymer comprising an ethylenic monomer bearing an epoxy function or a core-shell compound.

The composition also has the advantage of having excellent fluidity during its use.

The ethylenic monomer bearing an epoxy function is preferentially glycidyl (meth) acrylate.

The copolymer (B) may be a copolymer of ethylene, of glycidyl methacrylate and optionally an alkyl acrylate and/or methacrylate in which the alkyl chain comprises from 1 to 30 carbon atoms, the latter monomers being combined under the term alkyl (meth)acrylate in the present description. The amount of alkyl (meth)acrylate may be within the range from 0 (i.e. containing none) to 40% relative to the total mass of said olefinic copolymer (B), advantageously from 5% to 35% and preferably from 20% to 30%.

The amount of ethylenic monomer bearing an epoxy function in said olefinic copolymer (B) is, for example, in the range from 0.1% to 20% relative to its total mass, advantageously from 2% to 15% and preferably from 5% to 10%.

The composition may also comprise an additional olefinic polymer (C) other than the olefinic copolymers comprising an ethylenic monomer bearing an epoxy function. Preferentially, this additional olefinic polymer (C) is a copolymer of ethylene and of an alkyl (meth)acrylate, a copolymer of ethylene and of a vinyl ester of a carboxylic acid, a copolymer of ethylene and of a (meth)acrylic acid or an ionomer, most preferentially a copolymer of ethylene and of an alkyl acrylate with an alkyl chain ranging from 1 to 20, for instance methyl acrylate, ethylene acrylate or n-butyl acrylate. In this case, the composition advantageously has a mass ratio (B)/(C) within the range from 90/10 to 10/90 and preferentially from 75/25 to 40/60.

Advantageously, the mass ratio (A)/((B)+optional (C)) is within the range from 90/10 to 10/90, for example 85/15 to 40/60, more advantageously from 80/20 to 50/50 and preferentially from 75/25 to 60/40.

The amount of modifier ((A)+(B)+optional (C)) may be within the range from 1% to 30% by mass of the total composition, advantageously from 2% to 15% and preferentially from 3% to 9%.

The amount, in polymerized form, of ethylenic monomer comprising an epoxy function may be within the range from 0.01% to 2%, advantageously from 0.02% to 1% and preferentially from 0.03% to 0.7% relative to the mass of the total composition.

As regards the elastomeric core-shell compound (A), the glass transition temperature of the core polymer is preferentially less than 20° C., for example between −140° C. and 0° C. Preferentially, the glass transition temperature of the core polymer is greater than 20° C., for example between 30° C. and 250° C.

As regards the elastomeric core-shell compound (A), its shell part preferentially comprises, in polymerized form:
an alkyl methacrylate in which the alkyl chain comprises from 1 to 12 and preferably from 1 to 4 carbon atoms;
and/or a vinyl aromatic organic compound comprising from 6 to 12 carbon atoms, such as styrene;
and/or acrylonitrile;
this shell part possibly being crosslinked.

The core part of the core-shell compound (A) advantageously comprises, in polymerized form:
a conjugated diene comprising from 4 to 12 and preferably from 4 to 8 carbon atoms;
or an alkyl acrylate in which the alkyl chain comprises from 1 to 12 and preferably from 1 to 8 carbon atoms.

The core-shell compound (A) may be chosen from:
a compound with a core comprising butadiene and a shell comprising methyl methacrylate, ethyl acrylate, butyl acrylate, methacrylic acid and/or styrene;
a compound with a core comprising butyl acrylate, n-octyl acrylate and/or 2-ethylhexyl acrylate and a shell comprising methyl methacrylate;
a compound with a core comprising butadiene and a shell comprising a mixture of acrylonitrile and styrene.

As regards the core-shell compound, the mass amount of core is advantageously within the range from 10% to 99%, for example from 60% to 95%, of the total mass of the core-shell compound.

The size of the core-shell compounds is advantageously between 50 and 600 nm.

Preferentially, the PHA is chosen from polylactic acid (PLA) and polyglycolic acid (PGA).

A subject of the invention is also a process for preparing the modified PHA composition, in which the mixture of PHA, of (A), of (B), of the optional (C) with, optionally, one or more additives such as a nucleating agent, is prepared by extrusion.

According to one preferred process of the invention, the following are performed:
mixing of (A), (B) and optional (C) to form an impact modifier in a first step, and then
in a second step, mixing of the impact modifier obtained from the first step with PHA.

According to another process for preparing the abovementioned composition that is the subject of the present invention, the following are performed:
a first step of manufacturing the impact modifier by mixing at a temperature at which the copolymer is in molten form and at a maximum temperature within the range from 60 to 180° C.;
a second step of manufacturing the polyhydroxy-alkanoic acid (PHA) composition by extrusion or by mixing the impact modifier obtained in the first step and said PHA.

Advantageously, the step for manufacturing the impact modifier of the first step is performed such that the maximum temperature is within the range from 70 to 140° C.

According to one embodiment, the step for manufacturing the abovementioned impact modifier of the first step is performed by extrusion in a twin-screw or single-screw extruder, preferentially a single-screw extruder. According to one embodiment, the step for manufacturing the impact modifier of the first step is performed by mixing in molten form in a co-rotating twin-screw extruder or a counter-rotating twin-screw extruder or a co-kneader or an internal mixer or a single-screw extruder, preferentially in a single-screw extruder. It is understood that all the steps for manufacturing the impact modifier, including mixing in melt form, are considered herein as extrusions.

Preferentially, the residence time of the impact modifier in the first step is within the range from 10 to 300 seconds.

According to one embodiment, the second step for manufacturing the mixture of the impact modifier obtained in the first step and of the abovementioned PHA may be performed such that the mixing temperature is within the range from 180 to 320° C.

One subject of the invention is a part or object, for instance wrapping, comprising the modified PHA composition.

The invention also relates to a process for manufacturing the part or object, comprising a step of forming said composition, for example by injection-molding, pressing or calendering, said part or said object optionally undergoing an annealing step.

DETAILED DESCRIPTION OF THE INVENTION

The present invention relates to a polyhydroxyalkanoate (PHA) composition also comprising a core-shell compound (A) and a polymer comprising an ethylenic monomer bearing an epoxy function (B).

According to the invention, when one of the polymers of the composition or a composition "comprises a monomer", this means that it is present in polymerized form in said polymer or one (or more) polymer(s) of said composition.

Polymers of PHA type are biodegradable polymers. Some of them are also biorenewable, the monomers being produced by bacterial fermentation processes or alternatively extracted from plants. The term "biodegradable" applies to a material if it can be degraded by microorganisms. The result of this degradation is the formation of water, $CO_2$ and/or $CH_4$ and, optionally, of byproducts (residues, new biomass) that are not toxic to the environment. It is possible, for example, to use standard EN13432 to determine whether the material is biodegradable. To determine whether a polymer is "biorenewable", standard ASTM D 6866 may be used. Biorenewable polymers are characterized in that they comprise carbon of renewable origin, i.e. $^{14}C$. Specifically, all the carbon samples taken from live organisms and in particular from the plant material used to form the biorenewable polymers are a mixture of three isotopes: $^{12}C$, $^{13}C$ and $^{14}C$ in a $^{14}C/^{12}C$ ratio that is kept constant by continuous exchange of the carbon with the environment and which is equal to $1.2 \times 10^{-12}$. Although $^{14}C$ is radioactive and its concentration thus decreases over time, its half life is 5730 years, and as such it is considered that the $^{14}C$ content is constant from the time of extraction of the plant material up to the manufacture of the biorenewable polymers and even up to the end of their use. For example, it may be considered that the polymer is biorenewable when the $^{14}C/^{12}C$ ratio is greater than or equal to $1 \times 10^{-12}$.

The $^{14}C$ content of biorenewable polymers may be measured, for example, according to the following liquid scintillation spectrometry or mass spectrometry techniques. These methods for measuring the $^{14}C$ content of materials are described precisely in standards ASTM D 6866 (especially D6866-06) and in standards ASTM D 7026 (especially 7026-04). These methods measure the $^{14}C/^{12}C$ ratio of a sample and compare it with the $^{14}C/^{12}C$ ratio of a reference sample of 100% renewable origin, to give a relative percentage of carbon of renewable origin in the sample.

The measuring method preferentially used in the case of biorenewable polymers is mass spectrometry described in standard ASTM D6866-06 (accelerator mass spectroscopy).

PHAs are polymers comprising hydroxyalkanoic acid units, for example containing from 2 to 10 carbon atoms. Examples that may be mentioned include the polymer comprising 6-hydroxyhexanoic acid known as polycaprolactone (PCL), polymers comprising 3-hydroxy-hexanoic acid, 4-hydroxyhexanoic acid or 3-hydroxy-heptanoic acid. Polymers containing 5 carbon atoms or less, for example polymers comprising glycolic acid (PGA), lactic acid (PLA), 3-hydroxypropionate, 2-hydroxybutyrate, 3-hydroxybutyrate (PHB), 4-hydroxy-butyrate, 3-hydroxyvalerate, 4-hydroxyvalerate and 5-hydroxyvalerate may be noted in particular. Preferred polymers are PGA, PCL, PLA and PHB. The PHAs may be aliphatic.

PHAs may also be copolymers, i.e. they may comprise a first hydroxyalkanoic acid and another unit that may be either a second hydroxyalkanoic acid different than the first, or another monomer such as diols, for instance ethylene glycol, 1,3-propanediol and 1,4-butanediol or diacids such as succinic acid, adipic acid and terephthalic acid.

The compositions of the invention may also comprise mixtures of these polymers.

PHAs are often polymerized in bulk. A PHA may be synthesized by dehydration and condensation of the hydroxyalkanoic acid. It may also be synthesized by dealcoholization and condensation of an alkyl ester of a hydroxyalkanoic acid or by polymerization by ring opening of a cyclic derivative of the corresponding lactone or of the dimer of the cyclic ester. Bulk polymerization is generally performed via a batch or continuous process. As examples of continuous processes for manufacturing PHA, mention may be made of the processes in patent applications JP-A 03-502115, JP-A 07-26001 and JP-A 07-53684. U.S. Pat. No. 2,668,162 and U.S. Pat. No. 3,297,033 describe batch processes.

As regards the core-shell copolymer (A), it is in the form of fine particles with a core made of soft polymer and at least one shell made of hard polymer and the size of the particles is generally less than a micrometer and advantageously between 50 and 600 nm.

Preferentially, the polymer of the core has a glass transition temperature of less than 20° C., for example between −140° C. and −0° C. and preferentially between −120° C. and −30° C. Preferentially, the polymer of the shell has a glass transition temperature of greater than 20° C., for example between 30° C. and 250° C.

The glass transition temperatures of the polymers of the composition may be measured according to standard ISO 11357-2:1999.

Examples of core polymers that may be mentioned include isoprene or butadiene homopolymers, isoprene-butadiene copolymers, copolymers of isoprene with not more than 98% by weight of a vinyl monomer and copolymers of butadiene with not more than 98% by weight of a vinyl monomer. The vinyl monomer may be styrene, an alkyl-styrene, acrylonitrile, an alkyl (meth)acrylate, butadiene or isoprene. The core polymer may also comprise siloxane, optionally copolymerized with an alkyl acrylate. The core of the core-shell copolymer may be totally or partially crosslinked. To do this, it suffices to add at least difunctional monomers during the preparation of the core, and these monomers may be chosen from poly(meth)acrylic esters of polyols such as butylene di(meth)acrylate and trimethylolpropane trimethacrylate. Other multifunctional monomers are, for example, divinylbenzene, trivinylbenzene, vinyl acrylate and vinyl methacrylate, and triallyl cyanurate. The core may also be crosslinked by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate. Crosslinking may also be performed using the intrinsic reactivity of monomers, for example dienes.

The shell(s) are homopolymers of styrene, of an alkyl-styrene or of methyl methacrylate or copolymers comprising at least 70% by weight of one of the preceding monomers and at least one comonomer chosen from the other preceding monomers, another alkyl (meth)acrylate, vinyl acetate and acrylonitrile. The shell may be functionalized by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid, glycidyl methacrylate, hydroxyethyl methacrylate and alkyl(meth)acrylamides. Examples that may be mentioned include core-shell copolymers with a shell made of polystyrene and core-shell copolymers with a shell made of PMMA. The shell may also contain imide functions, either by copolymerization with a maleimide, or by chemical modification of the PMMA with a primary amine. Advantageously, the molar percentage of imide functions is from 30% to 60% (relative to the shell as a whole). Core-shell copolymers containing two shells also exist, one made of polystyrene and the other on the exterior made of PMMA. Examples of copolymers and of processes for preparing them are described in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928, U.S. Pat. No. 3,985,704, U.S. Pat. No. 5,773,520.

The core represents, for example, in this invention, 5% to 95% by weight of the core-shell compound, and the shell 95% to 5% by weight.

An example of a copolymer that may be mentioned is the one consisting of (i) from 50 to 95 parts of a core comprising, in moles, at least 93% butadiene, 5% styrene and 0.5% to 1% divinylbenzene and (ii) from 5 to 50 parts of two shells essentially of the same weight, the inner one made of polystyrene and the outer one made of PMMA.

Preferentially, core-shell compounds with a core made of butyl acrylate copolymer and a shell made of PMMA may be used. These compounds have the advantage of being particularly transparent.

All these core-shell compounds are occasionally referred to as soft/hard on account of the elastomeric core. It would not constitute a departure from the context of the invention to use core-shell copolymers such as hard/soft/hard copolymers, i.e. copolymers which have in this order a hard core, a soft shell and a hard shell. The hard parts may consist of polymers of the shell of the preceding soft/hard copolymers and the soft part may consist of polymers of the core of the preceding soft/hard copolymers.

Examples that may be mentioned include those described in EP 270 865, and those consisting of, in this order:
  a core made of a copolymer of methyl methacrylate and of ethyl acrylate,
  a shell made of a copolymer of butyl acrylate and of styrene,
  a shell made of a copolymer of methyl methacrylate and of ethyl acrylate.

Other types of core-shell copolymer also exist, such as hard (core)/soft/semi-hard copolymers. Compared with the preceding copolymers, the difference lies in the "semi-hard" outer shell which consists of two shells: one intermediate and the other outer. The intermediate shell is a copolymer of methyl methacrylate, of styrene and of at least one monomer chosen from alkyl acrylates, butadiene and isoprene. The outer shell is a PMMA homopolymer or copolymer.

Examples that may be mentioned include those consisting of, in this order:
  a core made of a copolymer of methyl methacrylate and of ethyl acrylate,
  a shell made of a copolymer of butyl acrylate and of styrene,
  a shell made of a copolymer of methyl methacrylate, of butyl acrylate and of styrene,
  a shell made of a copolymer of methyl methacrylate and of ethyl acrylate.

Compounds (A) are sold by the Applicant under the brand names Biostrength®, Durastrength® and Clearstrength®.

The polymer (B) comprises an ethylenic monomer bearing an epoxy function. Preferentially, it is a statistical copolymer. The ethylenic monomer bearing an epoxy function may be an unsaturated epoxide such as:
  aliphatic glycidyl esters and ethers such as allyl glycidyl ether, vinyl glycidyl ether, glycidyl maleate and itaconate, and glycidyl (meth) acrylate, and
  alicyclic glycidyl esters and ethers such as 2-cyclohexene-1-glycidyl ether, cyclohexene-4,5-diglycidyl carboxylate, cyclohexene-4-glycidyl carboxylate, 5-norbornene-2-methyl-2-glycidyl carboxylate and endocis-bicyclo-(2.2.1)-5-heptene-2,3-diglycidyl dicarboxylate.

Glycidyl methacrylate is preferred as ethylenic monomer bearing an epoxy function.

Preferentially, the polymer (B) is an olefinic copolymer comprising an ethylenic monomer bearing an epoxy function, i.e. it is a copolymer of the abovementioned ethylenic monomer and of at least one α-olefin, which may comprise from 2 to 20 carbon atoms, such as ethylene or propylene, preferentially ethylene.

The olefinic copolymer may also comprise at least one monomer different than the abovementioned α-olefins and than the ethylenic monomer bearing an epoxy function. Non-limiting examples that may be mentioned include:
- a conjugated diene, for instance 1,4-hexadiene;
- carbon monoxide;
- an unsaturated carboxylic acid ester, for instance alkyl (meth)acrylates;
- a saturated carboxylic acid vinyl ester, for instance vinyl acetate or vinyl propionate.

According to one advantageous mode, the olefinic copolymer comprises an alkyl (meth)acrylate. The alkyl chain may contain up to 24 carbons. Those in which the alkyl chain comprises from 1 to 12, advantageously from 1 to 6 or even from 1 to 4 carbon atoms are preferred. Advantageously, the alkyl (meth)acrylates are n-butyl acrylate, isobutyl acrylate, 2-ethylhexyl acrylate, ethyl acrylate and methyl acrylate. Preferentially, the alkyl (meth)acrylates are n-butyl acrylate, ethyl acrylate and methyl acrylate. Most preferably, it is methyl acrylate.

The polymers that are most preferred are ethylene-alkyl acrylate-glycidyl methacrylate copolymers and ethylene-glycidyl methacrylate copolymers.

The amount of monomer other than the ethylenic monomer bearing an epoxy function and than the α-olefins, for instance alkyl (meth)acrylate, may be within the range from 0 (i.e. it does not comprise any) to 40% relative to the total mass of said olefinic copolymer (B), advantageously from 5% to 35% and preferably from 20% to 30%.

The amount of ethylenic monomer bearing an epoxy function in said olefinic copolymer (B) is, for example, in the range from 0.1% to 20% relative to its total mass, advantageously from 2% to 15% and preferably from 5% to 10%.

Copolymers (B) are sold by the Applicant under the brand name Lotader®.

The composition of the invention may also comprise an additional olefinic polymer (C), for instance ethylene copolymers other than (B), i.e. not comprising any monomer bearing an epoxy function. These may be chosen from copolymers comprising ethylene and a vinyl ester or copolymers comprising ethylene and an alkyl (meth)acrylate, such as copolymers consisting of ethylene and an alkyl (meth)acrylate. The alkyl chain of the (meth)acrylate may contain up to 20 carbons. Those in which the alkyl chain comprises from 1 to 12, advantageously from 1 to 6 or even from 1 to 4 carbon atoms are preferred. Advantageously, the alkyl (meth)acrylates are n-butyl acrylate, isobutyl acrylate, 2-ethylhexyl acrylate, ethyl acrylate and methyl acrylate. Preferentially, the alkyl (meth)acrylates are n-butyl acrylate, ethyl acrylate and methyl acrylate. Preferentially, the amount of alkyl (meth)acrylate ranges from 1% to 40% relative to the total mass of said olefinic copolymer (C), advantageously from 5% to 35% and preferably from 20% to 30%.

Copolymers (C) are sold by the Applicant under the brand name Lotryl®.

The amounts of the various monomers present in the various polymers of the invention may be measured by infrared spectroscopy, for example using the method described in standard IS08985.

The processes for manufacturing the copolymers (B) and (C) are known. They may be manufactured via high-pressure radical polymerization, for example in a tubular or autoclave reactor.

According to a most preferred mode of the invention, the polyhydroxyalkanoic acid (PHA) composition also comprises:
(A) an elastomeric compound of core-shell type;
(B) a copolymer chosen from copolymers of ethylene and of glycidyl methacrylate; and
(C) a copolymer of ethylene and of an alkyl (meth)acrylate in which the alkyl chain comprises from 1 to 20 carbon atoms.

The composition may also comprise additives for improving certain properties of the PHA composition, such as nucleating agents, plasticizers, dyes, UV absorbers, stabilizers, antioxidants, fillers, flame retardants, lubricants, antiblocking agents, mold-release agents or additives for facilitating the process, commonly known as "processing aids".

The composition according to the invention may be manufactured by mixing the various constituents via standard thermoplastic processing means, for instance extrusion or blending. Internal mixers with paddles or rotors, an external mixer, and co-rotating or counter-rotating single-screw or twin-screw extruders may be used. Preferentially, the composition is prepared at a temperature greater than or equal to the glass transition temperature of the PHA, or even above. The composition may be prepared, for example, at a temperature within the range from 160° C. to 260° C.

According to a preferred process of the invention, a step of mixing of an impact modifier into the PHA is performed, said impact modifier being a mixture comprising (A), (B) and the optional (C).

Since compound (A) is pulverulent, the process for manufacturing the PHA composition is facilitated by mixing (A) with (B) and the optional (C), the impact modifier thus obtained then possibly being in the form of granules that are easier to manipulate during the PHA transformation process.

Another subject of the invention is a part or an object, such as a wrapping, a film or a sheet, manufactured from the composition according to the invention.

To manufacture this part or this object, the known molding techniques may be used, such as a press or an injection-molded press, or alternatively the known extrusion-blow molding techniques. The films or sheets may also be manufactured via the techniques of cast-film extrusion, blown-film extrusion or calendering.

The process for manufacturing this part may also comprise an annealing step for crystallizing the PHA and thus for improving its mechanical properties.

Examples of compositions will now be described in the examples that follow; these examples are given as illustrations and do not in any way limit the scope of the claimed invention.

EXAMPLES

To prepare examples of the composition and the structures according to the invention, the following products were used:
(a1): core-shell compound based on butadiene, methyl methacrylate, ethyl acrylate and butyl acrylate;
(a2): core-shell compound based on butyl acrylate and methyl methacrylate;
(a3): core-shell compound comprising acrylo-nitrile, butadiene and styrene;
(b): ethylene-methyl acrylate-glycidyl meth-acrylate copolymer comprising, by weight, 25% acrylate and 8% glycidyl methacrylate (Lotader® AX 8900) whose melting point measured by DSC (ISO 11357-03) is 65° C.;

(c): ethylene-butyl acrylate copolymer comprising, by weight, 30% acrylate (Lotryl® 30BA02) whose melting point measured by DSC (ISO 11357-03) is 78° C.;

(d): polylactic acid 2002D sold by NatureWorks®.

Compositions (4) and (5) according to the invention and comparative compositions (1), (2) and (3) comprise the constituents (a), (b1), (b2), (b3), (c) and (d) in the proportions given in Table 1.

Compositions (1) to (5) were prepared in a single step. The mixing of the constituents in the ratio given in Table 1 is performed by extrusion. The extrusion is performed in an extruder of co-rotating twin-screw type with a diameter of 16 mm and an L/D ratio of 25 (Haake PTW16/25). The maximum mixture temperature is 240° C.

Since the constituents (b1), (b2) and (b3) are powders and the extruder mentioned previously is equipped with only one metering device, it is necessary to mill the constituents (a) and (d) by cryomilling until a fine powder is obtained, so as to obtain correct metering of the constituents into the extruder for the preparation of the mixtures (2) to (5).

The compositions are then injected at 200° C. into a mold regulated at 30° C. by means of an injector press of Krauss Maffei 60-210 B1 type.

The notched Charpy impact properties are measured according to standard ISO 179:2000 after annealing the samples for 1 hour at 110° C. to crystallize the polylactic acid. The higher the Charpy impact value, the better the impact strength. These properties were measured at room temperature (23° C.) and under cold conditions (0° C. and/or −40° C.). The values obtained are collated in Table 2.

The notched Charpy impact properties are also measured at room temperature according to standard ISO 179:2000 without annealing. The values obtained are collated in Table 3.

TABLE 1

| Compositions | Mass percentage (a)/((a) + (b) + (c) + (d)) | Mass percentage (b)/((a) + (b) + (c) + (d)) | Mass percentage (c)/((a) + (b) + (c) + (d)) |
|---|---|---|---|
| (1) | 0% | 2% | 8% |
| (2) | a3: 10% | 0% | 0% |
| (3) | a1: 10% | 0% | 0% |
| (4) | a1: 7% | 3% | 0% |
| (5) | a1: 5% | 5% | 0% |
| (6) | a2: 7.5% | 7.5% | 0% |
| (7) | a2: 3% | 3% | 0% |
| (8) | 0% | 10% | 0% |
| (9) | a2: 10% | 0% | 0% |
| (10) | a2: 5% | 5% | 0% |
| (11) | a2: 7% | 3% | 0% |

TABLE 2

| Compositions | Charpy impact 23° C. | Charpy impact 0° C. | Charpy impact −40° C. |
|---|---|---|---|
| (1) | 11 | Not measured | 6 |
| (2) | 13.5 | Not measured | 6.5 |
| (3) | 38 | 15 | 9 |
| (4) | 68 | 39 | 10 |
| (5) | 54 | 39 | 10 |
| (6) | 62 | Not measured | Not measured |
| (7) | 20 | Not measured | Not measured |
| (8) | 9 | Not measured | 4 |
| (9) | 8 | Not measured | 4 |
| (10) | 40 | 14 | 5 |
| (11) | 20 | 10 | 4 |

TABLE 3

(without annealing)

| Compositions | Charpy impact 23° C. | Notched Izod [ft lb/in] 23 C. |
|---|---|---|
| (1) | 5 | — |
| (2) | 9 | — |
| (3) | 14 | — |
| (4) | 27 | — |
| (6) | 50 | — |
| (8) | 5 | 0.98 |
| (9) | 6 | 1.52 |
| (10) | 20 | 5.06 |
| (11) | 13 | 4.62 |

The compositions prepared according to the invention have improved impact properties when compared with those obtained from the prior art.

The invention claimed is:

1. A composition comprising polyhydroxyalkanoic acid (PHA) and further comprising:
   (A) an elastomeric compound of core-shell type; and
   (B) an olefinic copolymer comprising an ethylenic monomer bearing an epoxy function;
   wherein the mass ratio (A)/(B) is within the range from 90/10 to 10/90.

2. The composition as claimed in claim 1, wherein the ethylenic monomer bearing an epoxy function is glycidyl (meth)acrylate.

3. The composition as claimed in claim 1, wherein (B) is a copolymer of ethylene, of glycidyl methacrylate and optionally of an alkyl (meth)acrylate in which the alkyl chain comprises from 1 to 30 carbon atoms.

4. The composition as claimed in claim 1, further comprising an additional olefinic polymer (C) other than the olefinic copolymer comprising an ethylenic monomer bearing an epoxy function.

5. The composition as claimed in claim 4, in which the additional olefinic polymer (C) is a copolymer of ethylene and of an alkyl (meth)acrylate, a copolymer of ethylene and a carboxylic acid vinyl ester, a copolymer of ethylene and of a (meth)acrylic acid or an ionomer.

6. The composition as claimed in claim 4, in which the mass ratio (B)/(C) is within the range from 90/10 to 10/90.

7. The composition as claimed in claim 1, in which the amount of ((A)+(B)) is within the range from 1% to 30% by mass of the total composition.

8. The composition as claimed in claim 1, in which the amount, in polymerized form, of ethylenic monomer comprising an epoxy function is within the range from 0.01% to 2% by mass of the total composition.

9. The composition as claimed in claim 1, in which the polymer of the core of the core-shell compound (A) has a glass transition temperature of less than 20° C. and the polymer of the shell has a glass transition temperature of greater than 20° C.

10. The composition as claimed in claim 1, in which the mass amount of core is within the range from 60% to 95% of the total mass of the core-shell compound.

11. The composition as claimed in claim 1, in which the size of the elastomeric compound of core-shell type is between 50 and 600 nm.

12. The composition as claimed in claim 1, in which the PHA is chosen from polylactic acid (PLA) and polyglycolic acid (PGA).

13. A process for preparing a composition comprising polyhydroxyalkanoic acid (PHA) and further comprising:
(A) an elastomeric compound of core-shell type; and
(B) an olefinic copolymer comprising an ethylenic monomer bearing an epoxy function;

wherein the mass ratio (A)/(B) is within the range from 90/10 to 10/90, the process comprising a step wherein the mixture of PHA, of (A), and of (B) is prepared by blending or extrusion.

14. A process for preparing a composition comprising polyhydroxyalkanoic acid (PHA) and further comprising:
(A) an elastomeric compound of core-shell type; and
(B) an olefinic copolymer comprising an ethylenic monomer bearing an epoxy function;
wherein the mass ratio (A)/(B) is within the range from 90/10 to 10/90;
wherein the process comprises:
in a first step, preparing a mixture of (A), (B) and optionally an additional olefinic polymer (C) other than the olefinic copolymer comprising an ethylenic monomer bearing an epoxy function to form an impact modifier, and then
in a second step, preparing a mixture of the impact modifier obtained from the first step with PHA.

15. A part or object comprising a composition comprising polyhydroxyalkanoic acid (PHA) and further comprising:
(A) an elastomeric compound of core-shell type; and
(B) an olefinic copolymer comprising an ethylenic monomer bearing an epoxy function;

wherein the mass ratio (A)/(B) is within the range from 90/10 to 10/90.

16. A process for manufacturing a part or object comprising a composition comprising polyhydroxyalkanoic acid (PHA) and further comprising:
(A) an elastomeric compound of core-shell type; and
(B) an olefinic copolymer comprising an ethylenic monomer bearing an epoxy function;

wherein the mass ratio (A)/(B) is within the range from 90/10 to 10/90, wherein the process comprises a step of forming the composition and optionally undergoing an annealing step.

17. The composition as claimed in claim 4, wherein the additional olefinic polymer (C) is a copolymer of ethylene and an alkyl acrylate with an alkyl chain ranging from 1 to 20.

* * * * *